(12) United States Patent
Takikawa et al.

(10) Patent No.: US 10,005,191 B2
(45) Date of Patent: Jun. 26, 2018

(54) HOLDING APPARATUS FOR ROBOT

(71) Applicant: Fanuc Corporation, Yamanashi (JP)

(72) Inventors: Ryuji Takikawa, Yamanashi (JP);
Yuutarou Tsukahara, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days. days.

(21) Appl. No.: 15/450,172

(22) Filed: Mar. 6, 2017

(65) Prior Publication Data
US 2017/0297210 A1    Oct. 19, 2017

(30) Foreign Application Priority Data

Apr. 15, 2016    (JP) .................................. 2016-082388

(51) Int. Cl.
  *B25J 19/00* (2006.01)
  *B25J 15/12* (2006.01)
(52) U.S. Cl.
  CPC ........... *B25J 19/0091* (2013.01); *B25J 15/12* (2013.01)
(58) Field of Classification Search
  CPC .... B25B 9/00; B66C 1/00; B25J 15/02; B25J 15/12; B25J 15/0206; B25J 19/0091
  See application file for complete search history.

(56) References Cited

U.S. PATENT DOCUMENTS

| | | | |
|---|---|---|---|
| 3,527,492 A | 9/1970 | Hollis | |
| 4,962,957 A * | 10/1990 | Traber | B25J 1/04 294/100 |
| 5,201,501 A | 4/1993 | Fassler | |
| 5,577,785 A * | 11/1996 | Traber | B25J 1/04 294/100 |
| 6,874,833 B2 * | 4/2005 | Keith | B25J 1/02 294/115 |
| 2007/0241573 A1 * | 10/2007 | Teng | B25B 9/00 294/198 |
| 2008/0224488 A1 * | 9/2008 | Khubani | B25J 1/04 294/111 |
| 2015/0028613 A1 | 1/2015 | Nakayama | |

FOREIGN PATENT DOCUMENTS

| | | |
|---|---|---|
| JP | S56-046960 B | 11/1981 |
| JP | S60-094290 A | 5/1985 |

(Continued)

OTHER PUBLICATIONS

Japan Patent Office, Office Action dated Apr. 17, 2018 for Japan Patent Application No. 2016-082388.

*Primary Examiner* — Stephen A Vu
(74) *Attorney, Agent, or Firm* — Winstead PC

(57) ABSTRACT

There is provided a holding apparatus for a robot including: two or more finger sections disposed opposite to each other so as to face toward a holding center; a work pressing section on which a work abuts when the work is inserted between the finger sections; and a driving unit that moves respective distal ends of the finger sections toward the holding center, wherein each of the finger sections includes a finger section main body formed of at least two plate-like elastic bodies, and a reinforcing member that is disposed along an outer surface of the main body, is joined to a distal end of the main body, and has higher rigidity than the main body, and the reinforcing member is swingably provided around an axis perpendicular to a longitudinal direction of the main body, and parallel to a surface of the main body.

4 Claims, 7 Drawing Sheets

(56) References Cited

FOREIGN PATENT DOCUMENTS

| | | |
|---|---|---|
| JP | S60-134594 U | 9/1985 |
| JP | H04-310390 A | 11/1992 |
| JP | H06-285784 A | 10/1994 |
| JP | H08-132378 A | 5/1996 |
| JP | 2002-154075 A | 5/2002 |
| JP | 2011-245566 A | 12/2011 |
| JP | 5681271 B1 | 3/2015 |

* cited by examiner

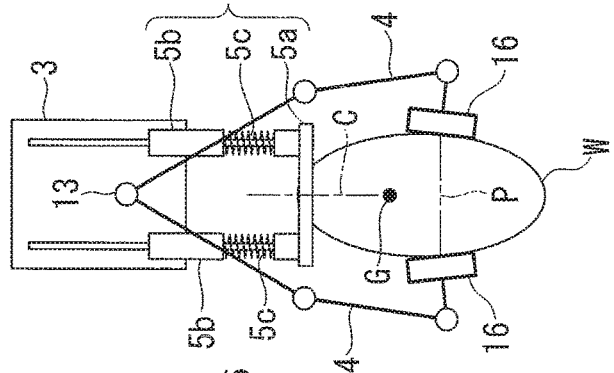
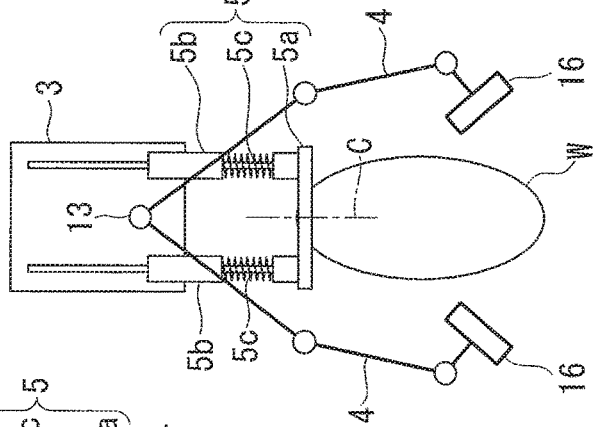
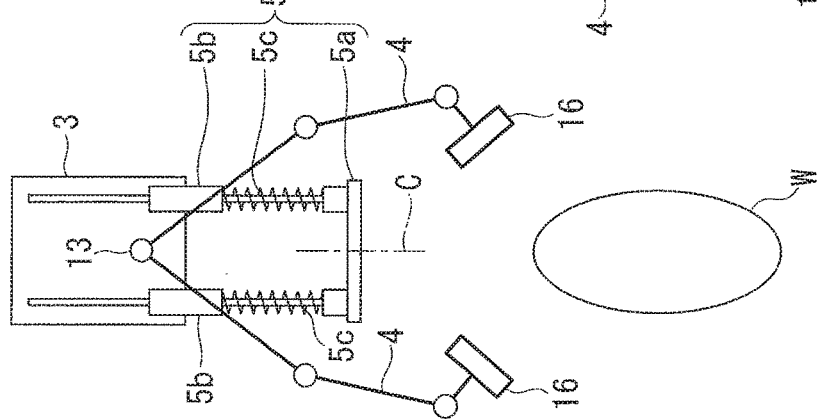

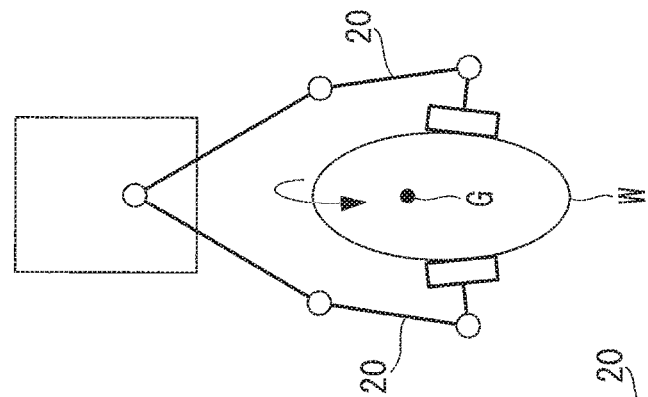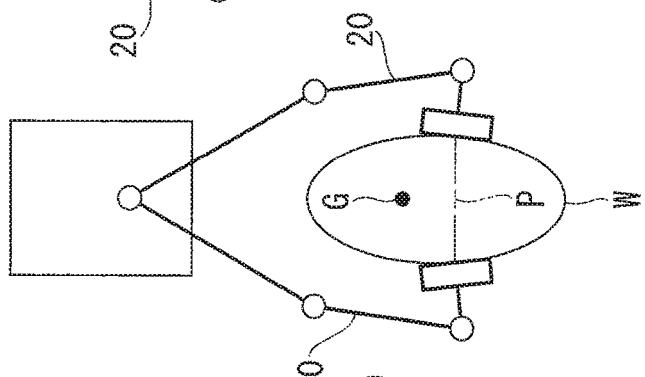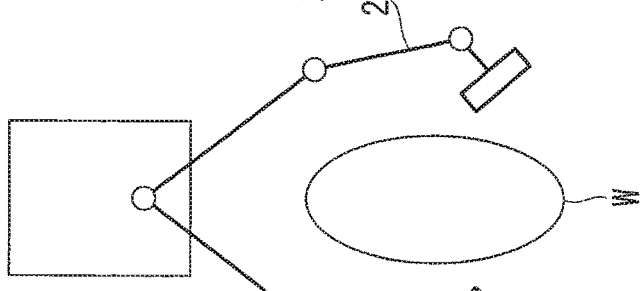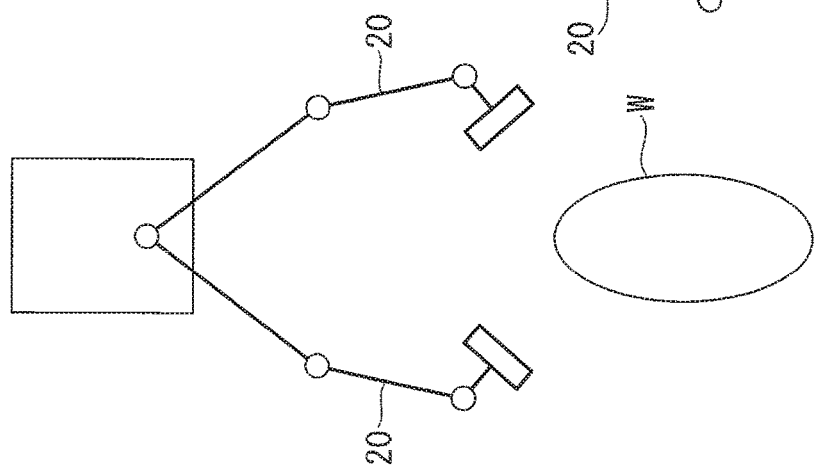

HOLDING APPARATUS FOR ROBOT

CROSS-REFERENCE TO RELATED APPLICATIONS

This application claims the benefit of Japanese Patent Application No. 2016-082388, the content of which is incorporated herein by reference.

TECHNICAL FIELD

The present invention relates to a holding apparatus for a robot.

BACKGROUND ART

Conventionally, a servo hand that has a structure similar to a human hand, and opens and closes finger sections is known as a holding apparatus for a robot for holding a work, the holding apparatus for a robot being mounted on a distal end of a wrist of a robot (refer to PTL 1, for example).

CITATION LIST

Patent Literature

{PTL 1}
Japanese Unexamined Patent Application, Publication No. 2011-245566

SUMMARY OF INVENTION

An aspect of the present invention is a holding apparatus for a robot including: two or more finger sections disposed opposite to each other so as to face toward a holding center; a work pressing section on which a work abuts when the work is inserted between the finger sections; and a driving unit that moves respective distal ends of the finger sections toward the holding center, wherein each of the finger sections includes a finger section main body formed of at least two plate-like elastic bodies, and a reinforcing member that is disposed along an outer surface of the finger section main body, is joined to a distal end of the finger section main body, and has higher rigidity than the finger section main body, and the reinforcing member is swingably provided around an axis perpendicular to a longitudinal direction of the finger section main body, and parallel to a surface of the finger section main body.

BRIEF DESCRIPTION OF DRAWINGS

FIG. 6A is a schematic diagram illustrating a state before the holding apparatus for a robot in FIG. 2 holds the work.

FIG. 6B is a schematic diagram illustrating a state where the urging means of the work pressing section is deformed in the holding apparatus for a robot in FIG. 2.

FIG. 6C is a schematic diagram illustrating a state where the holding apparatus for a robot in FIG. 2 holds the work by two finger sections.

FIG. 6D is a schematic diagram illustrating a state where the work held by the holding apparatus for a robot in FIG. 2 is handled.

FIG. 7A is a schematic diagram illustrating a state before a holding apparatus for a robot having no work pressing section holds the work.

FIG. 7B is a schematic diagram illustrating a state similar to a state where an urging means of a work pressing section is deformed in the holding apparatus for a robot having no work pressing section deforms.

FIG. 7C is a schematic diagram illustrating a state where the holding apparatus for a robot having no work pressing section holds the work by two finger sections.

FIG. 7D is a schematic diagram illustrating a state where the work held by the holding apparatus for a robot having no work pressing section is handled.

DESCRIPTION OF EMBODIMENTS

A holding apparatus 1 for a robot according to an embodiment of the present invention will be described with reference to the drawings.

Figure 1:
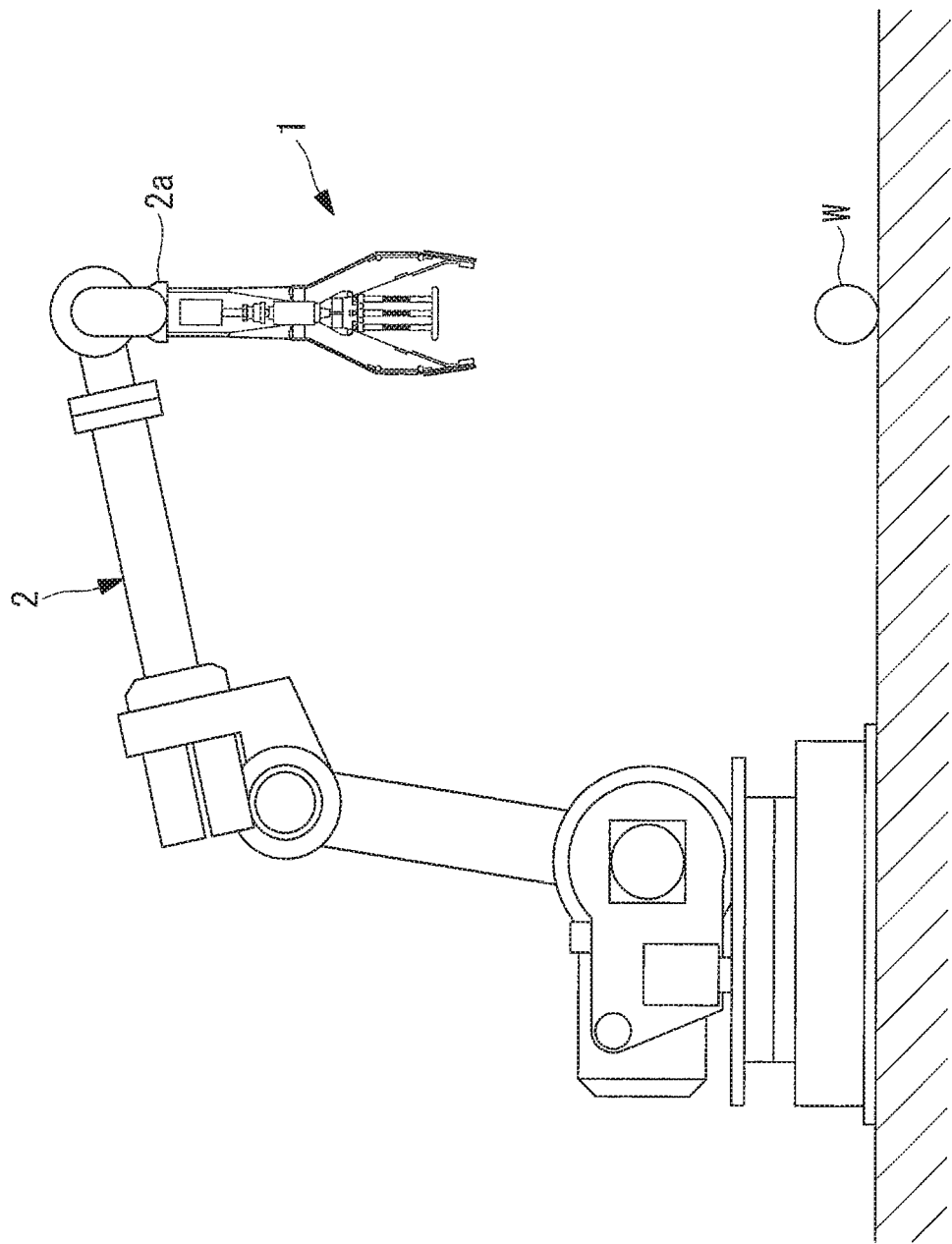
FIG. 1 is a diagram illustrating a robot mounted with a holding apparatus for a robot according to an embodiment of the present invention.

As illustrated in FIG. 1, the holding apparatus 1 for a robot according to this embodiment is an apparatus that is mounted on a distal end of a wrist 2a of a robot 2, and holds a work W.

As illustrated in FIG. 2 to FIG. 5, the holding apparatus 1 for a robot includes a bracket 3 fixed to the distal end of the wrist 2a of the robot 2, two finger sections 4 that are mounted on a distal end of the bracket 3, and disposed opposite to each other so as to face toward the holding center, a work pressing section 5 on which the work W abuts when the work W is inserted between the finger sections 4, and a driving unit 6 that moves respective distal ends of the finger sections 4 in the direction intersecting with the holding center.

The respective finger sections 4 includes a pair of finger section main bodies 7 formed of elongated plates, and reinforcing members 8 disposed on the outside of the finger section main bodies 7 and having higher rigidity than the finger section main bodies 7.

Each finger section main body 7 is formed by overlapping two spring steel sheets (plate-like elastic bodies) in the thickness direction, for example. The two spring steel sheets are fixed to each other at a proximal end and a distal end of the finger section main body 7 or near these.

The driving unit 6 includes an air cylinder (linear moving mechanism) 9 fixed to the bracket 3, and provided with an output shaft 9a capable of advancing and retreating along the holding center, and a shaft 11 connected to a distal end of the output shaft 9a through a universal joint 10. The shaft 11 is movably supported along the holding center by a linear ball bush 12 fixed to the bracket 3.

A movable block (movable part) 13 is fixed to a distal end of the shaft 11, and proximal ends of the two finger section main bodies 7 are fixed to the movable block 13. Reference numeral 14 denotes a cam follower that guides curvature such that each finger section main body 7 is not bent.

Each reinforcing member 8 includes a band plate-like first reinforcing component 8a having a proximal end fixed to the bracket 3, a band plate-like second reinforcing component 8b swingably mounted on a distal end of the first reinforcing component 8a by a first rotary joint 15a, and a band plate-like third reinforcing component 8c swingably mounted on a distal end of the second reinforcing component 8b by a second rotary joint 15b. A distal end of the finger section main body 7 is fixed to the third reinforcing component 8c. Additionally, an antislipping section 16 made of an elastic material such as rubber is fixed to the inside of a distal end of the third reinforcing component 8c.

The first rotary joint 15a and the second rotary joint 15b swingably connect the first reinforcing component 8a and the second reinforcing component 8b, and the second reinforcing component 8b and the third reinforcing component 8c around parallel swing axes orthogonal to the longitudinal directions of the first and second reinforcing components 8a, 8b and extending in the direction along surfaces of the first and second reinforcing components 8a, 8b.

Figure 4:
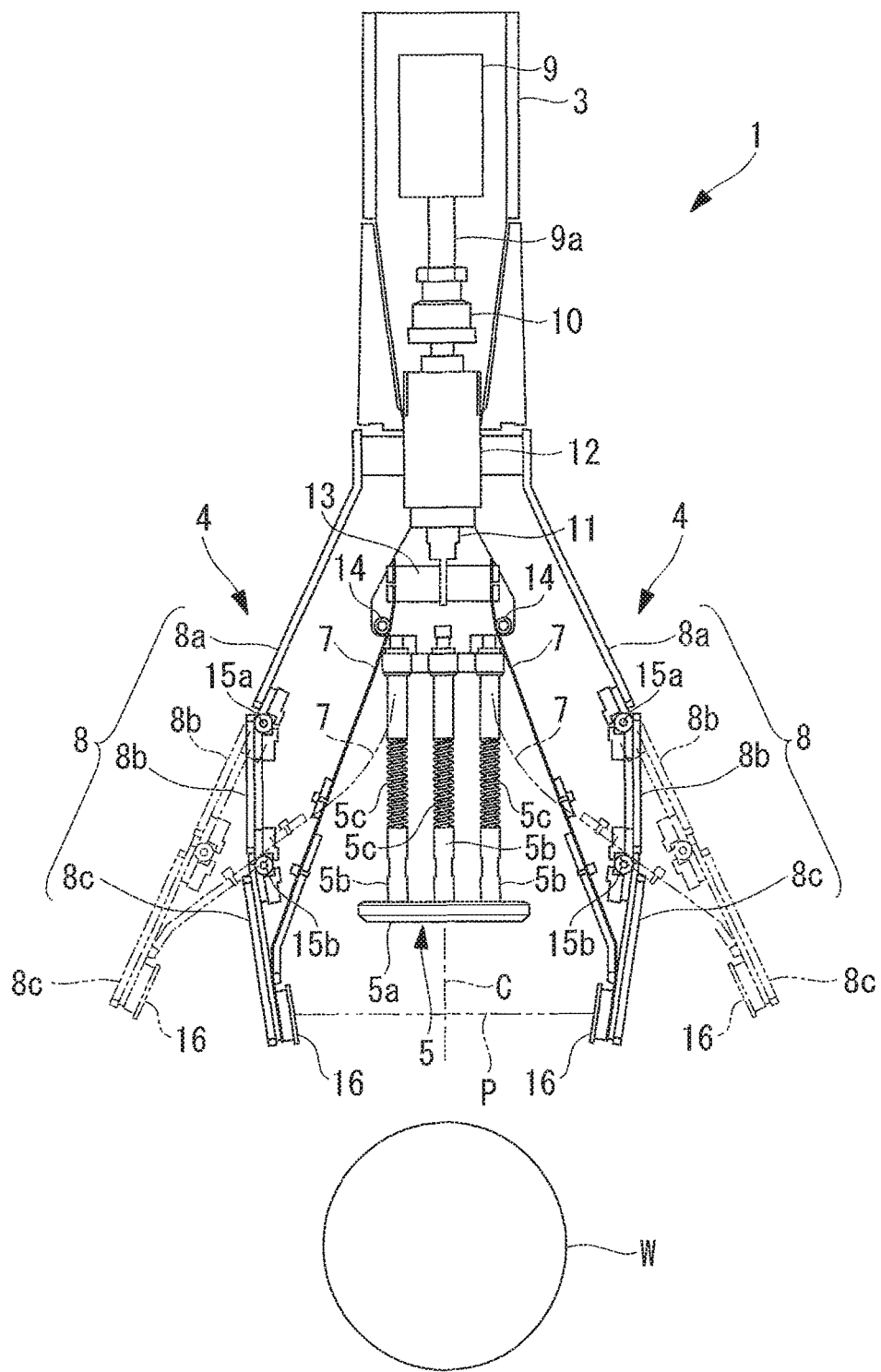
FIG. 4 is a front view illustrating a state where the holding apparatus for a robot in FIG. 2 does not hold a work.
Figure 5:
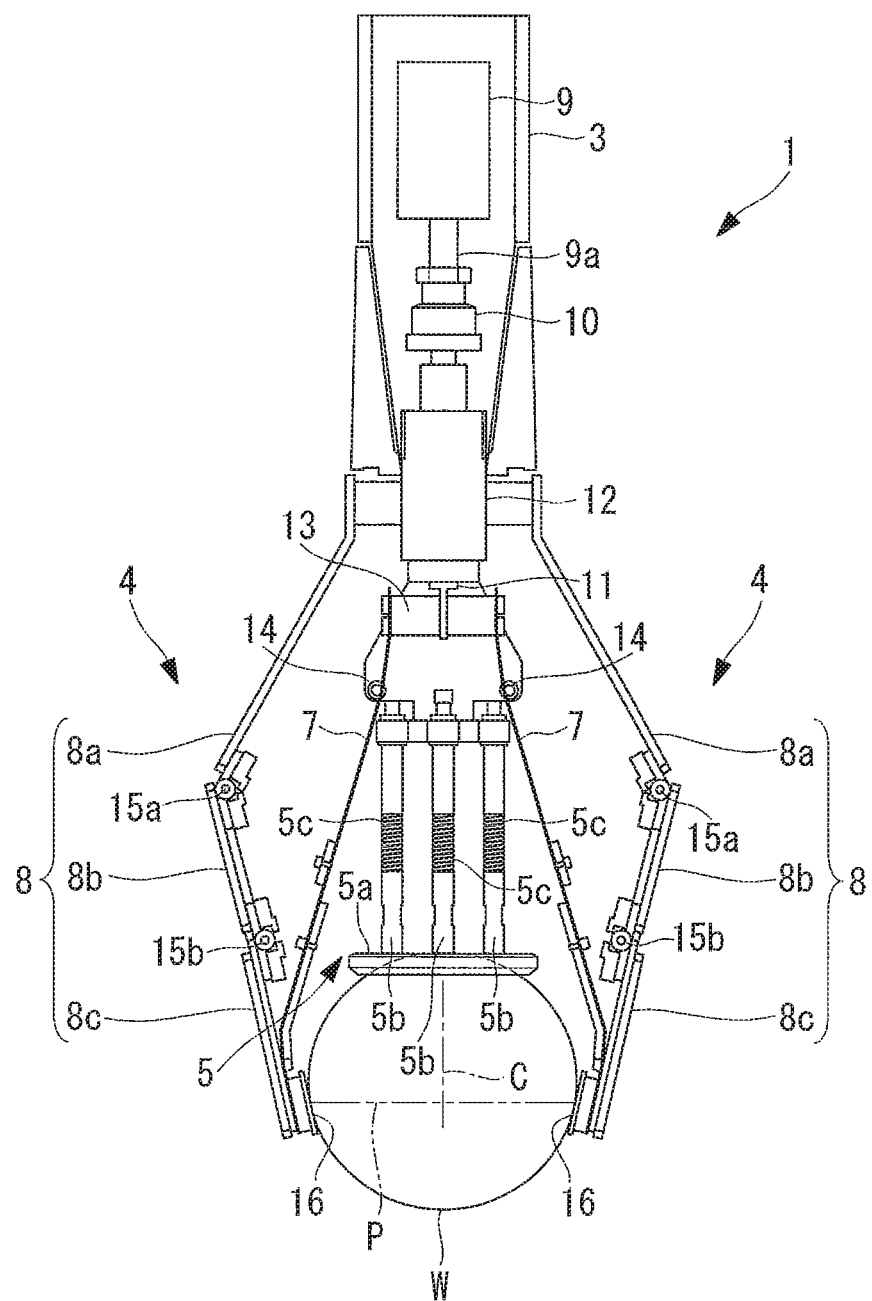
FIG. 5 is a front view illustrating a state where the holding apparatus for a robot in FIG. 2 holds the work.

As illustrated in FIG. 2 to FIG. 5, the work pressing section 5 includes an annular-shaped contact section 5a, three shafts 5b that support the contact section 5a so that the contact section 5a is movable with respect to the bracket 3 in the direction along the holding center, and coil springs (urging means) 5c provided in the shafts 5b, and urge the contact section 5a in the distal end direction. As illustrated in FIG. 4 and FIG. 5, the annular-shaped contact section 5a is disposed at a position surrounding the holding center C between the two finger sections 4, and is disposed on a side closer to the bracket 3 than a plane orthogonal to the holding center C and including a straight line connecting the two antislipping sections 16 at the distal end of the two finger sections 4.

Actions of the thus configured holding apparatus 1 for a robot according to this embodiment will be hereinafter described.

Figure 2:
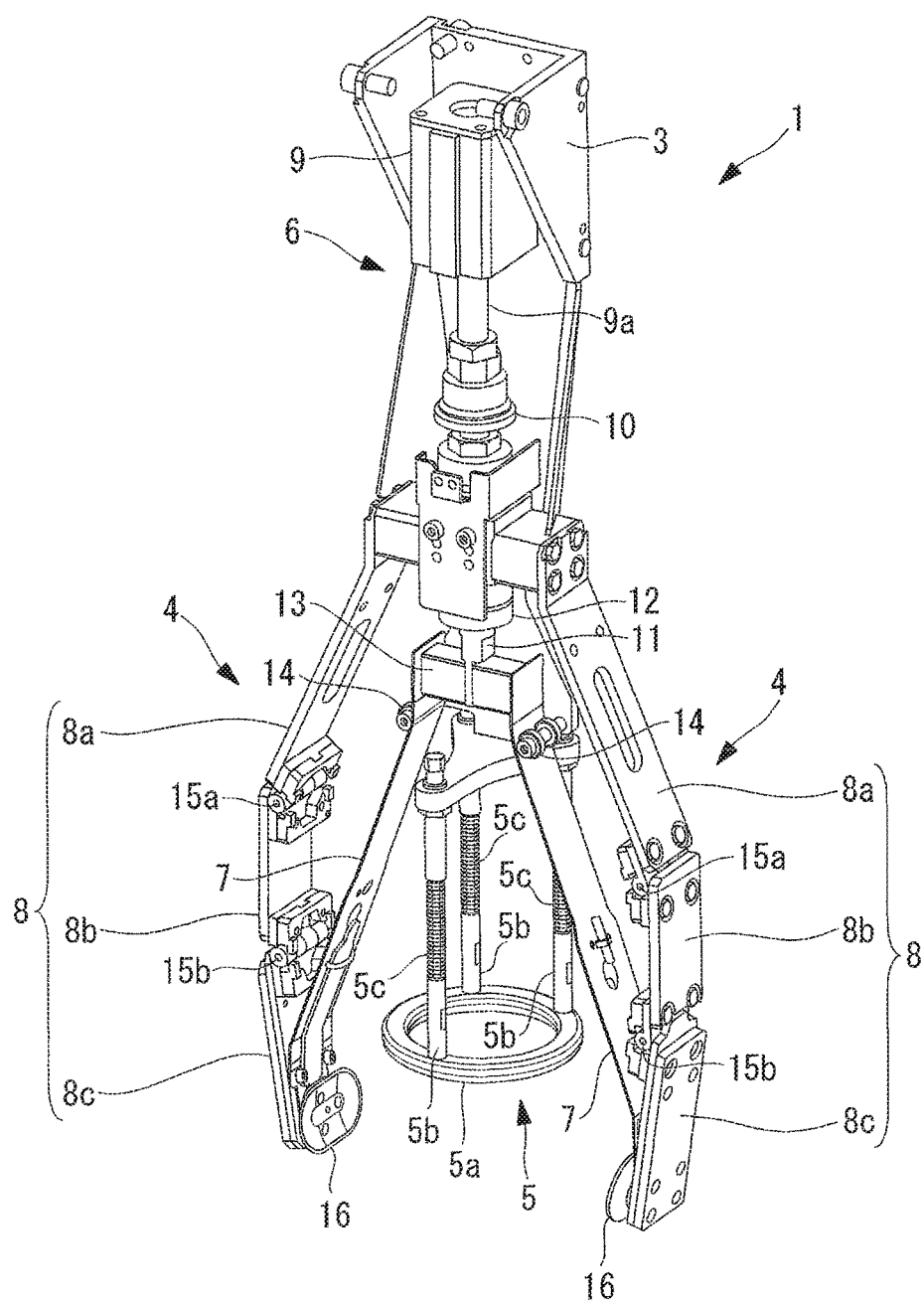
FIG. 2 is a perspective view illustrating the holding apparatus for a robot in FIG. 1.
Figure 3:
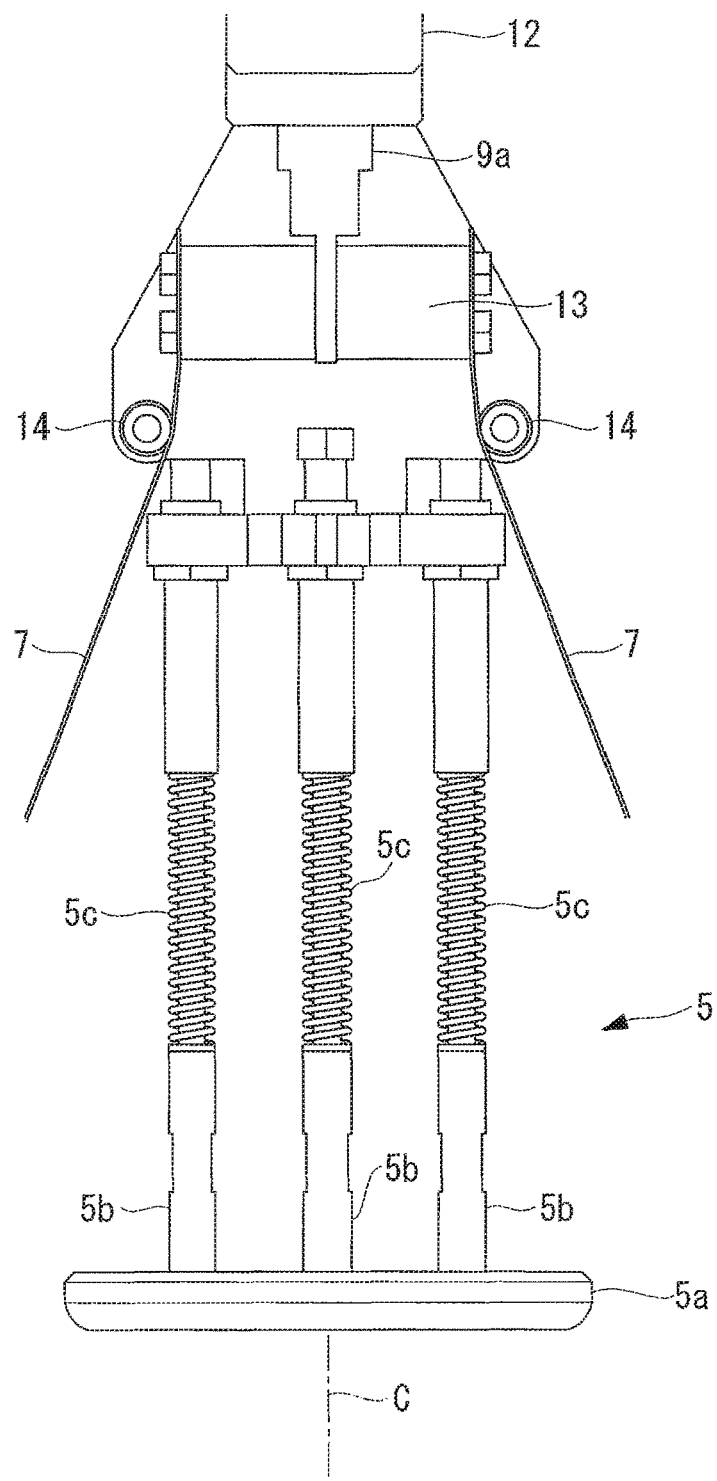
FIG. 3 is a partial enlarged view illustrating a work pressing section of the holding apparatus for a robot in FIG. 2.

In order to hold the work W by use of the holding apparatus 1 for a robot according to this embodiment, the air cylinder 9 of the driving unit 6 is first operated, and the shaft 11 is advanced toward the distal ends of the finger sections 4 along the holding center C, as illustrated in FIG. 2 and FIG. 4.

Consequently, the movable block 13 at the distal end of the shaft 11 is advanced, and the proximal ends of the finger section main bodies 7 fixed to the movable block 13 are advanced. When the proximal ends of the finger section main bodies 7 are advanced, the distal ends of the third reinforcing component 8c fixed to the distal ends of the finger section main bodies 7 are pressed in the distal end directions by extrusion force transmitted by the finger section main bodies 7 formed of spring steel sheets.

The third reinforcing components 8c are swingably mounted on the second reinforcing components 8b by the second rotary joints 15b, and therefore are swung with respect to the second reinforcing components 8b. Additionally, the second reinforcing components 8b are swingably mounted on the first reinforcing components 8a by the first rotary joints 15a, and therefore are swung with respect to the first reinforcing components 8a. The first rotary joints 15a and the second rotary joints 15b have the swing axes parallel to each other, and therefore the distal ends of the third reinforcing components 8c are moved in the respective directions away from the holding center C, and the finger section main bodies 7 are curved outward, as illustrated by chain lines of FIG. 4.

As a result, as illustrated in FIG. 4 and FIG. 6A, the antislipping sections 16 disposed on the inside of the two distal ends of the finger sections 4 are moved in the directions away from the holding center C, and an interval between the finger sections 4 for sandwiching the work W therebetween is largely widened.

In this state, the robot 2 is operated, so that the holding apparatus 1 for a robot is caused to move, and the work W is disposed in a space between the widened finger sections 4.

For example, when by the operation of the robot 2, the distal ends of the finger sections 4 are directed downward, and the holding center C is disposed in the substantially vertical direction, the whole of the holding apparatus 1 for a robot is caused to descend, and the two finger sections 4 in a state where the interval between the finger sections 4 is widened are made to come close to the work W from above the work W, the annular-shaped contact section 5a of the work pressing section 5 is brought into contact with an upper surface of the work W.

As illustrated in FIG. 6B, when the holding apparatus 1 for a robot is caused to further descend from this state, the coil springs 5c provided in the shafts 5b supporting the contact section 5a are compressed, and pressing force for pressing the contact section 5a against the work W is increased. When the holding apparatus 1 for a robot descends until the coil springs 5c are compressed by predetermined amounts, the holding apparatus 1 for a robot stops descending, and the air cylinder 9 is operated, so that the movable block 13 is retreated, namely raised.

Consequently, as illustrated in FIG. 6C, the proximal ends of the two finger section main bodies 7 fixed to the movable block 13 are raised, the finger section main bodies 7 are curved inward, the second reinforcing components 8b and the third reinforcing components 8c of the reinforcing members 8 are swung, and the distal ends of the two finger sections 4 are made to come close to each other toward the holding center C.

The antislipping sections 16 formed of elastic materials are provided on inner surfaces of the distal ends of the finger sections 4, and therefore when the distal ends of the finger sections 4 come close to each other, the two antislipping sections 16 of the two finger sections 4 come into contact at positions for sandwiching the work W of side surfaces of the work W disposed in the space between the distal ends, so that the work W is held.

That is, the work W is horizontally sandwiched between the antislipping section 16 located at two places, and an upper surface of the work W is supported by the contact section 5a of the work pressing section 5.

Accordingly, even when the gravity center G of the work W is located above a horizontal plane P connecting the antislipping sections 16, the upper surface of the work W is supported by the work pressing section 5. Therefore, as illustrated in FIG. 6D, even when the holding apparatus 1 for a robot holding the work W is moved by the operation of the robot 2, it is possible to more reliably prevent the work W from losing the balance to rotate, and there is an advantage that the work W can be maintained in a stably held state.

On the other hand, in a case where the work pressing section 5 is not provided, merely sandwiching the work W between two finger sections 20 from both sides sometimes causes the work W to become unstable, and to lose the balance to rotate, when the gravity center G exists above the horizontal plane P connecting the finger sections 20, as illustrated in FIG. 7A to FIG. 7D.

In this embodiment, the contact section 5a of the work pressing section 5 is provided so as to be movable in the direction along the holding center C, and therefore the holding apparatus 1 for a robot is caused to descend, and the contact section 5a escapes upward when the contact section 5a abuts on the work W, so that large impact force and pressing force can be prevented from being applied to the work W, and the work W can be maintained at a normal state.

In this embodiment, the contact section 5a is formed in an annular shape, and therefore can come into contact with on a convex curved surface of the work W in a wide range, and there is an advantage that the work W can be more stably supported by friction force between the work W and the contact section 5a.

The finger section main bodies 7 are each formed by the two spring steel sheets in this embodiment, but may be formed by one, or three or more spring steel sheets. Additionally, the finger section main bodies 7 may be formed of resin or the like having elasticity.

In place of the linear ball bush 12 for movably supporting the shaft 11, a slide bearing or a linear driving bearing with a guide rail may be employed.

As the driving unit 6, the air cylinder 9 is employed. However, in place of this, a hydraulic cylinder may be employed. Additionally, the shaft 11 may be formed by a ball screw or a rack and pinion, and may drive by a servomotor.

In this embodiment, the two finger sections 4 are provided. However, in place of these, three or more finger sections 4 may be provided.

As the contact section 5a, the annular-shaped contact section is exemplified. However, the contact section may be formed in other arbitrary shape, or other arbitrary annular shape.

From the above-described embodiment, the following invention is derived.

An aspect of the present invention is a holding apparatus for a robot including: two or more finger sections disposed opposite to each other so as to face toward a holding center; a work pressing section on which a work abuts when the work is inserted between the finger sections; and a driving unit that moves respective distal ends of the finger sections toward the holding center, wherein each of the finger sections includes a finger section main body formed of at least two plate-like elastic bodies, and a reinforcing member that is disposed along an outer surface of the finger section main body, is joined to a distal end of the finger section main body, and has higher rigidity than the finger section main body, and the reinforcing member is swingably provided around an axis perpendicular to a longitudinal direction of the finger section main body, and parallel to a surface of the finger section main body.

According to this aspect, in a case where the work is held, the driving unit is operated, so that the reinforcing members are swung around the swing axes, the finger section main bodies formed of at least the two plate-like elastic bodies are elastically deformed, the finger sections move in the directions away from the holding center, and an interval between the distal ends of the finger sections is widened. When the work is inserted between the finger sections in this state, a surface of the work abuts on the work pressing section. Then, the driving unit is operated, so that the finger sections are moved toward the holding center. Consequently, the work can be sandwiched between the finger sections to be held.

In this case, according to this aspect, even when the gravity center of the work is disposed above a plane connecting contact points between the work and the finger sections, the work pressing section is in contact with the surface of the work, so that the work can be prevented from losing the balance, and the work can be maintained in a stably held state.

In the above aspect, the driving unit may include a linear moving mechanism that moves proximal ends of the finger section main bodies along the holding center, and, by the linear moving mechanism, the finger section main bodies may be curved outward, and the distal ends of the finger sections may be separated from each other when the proximal ends of the finger section main bodies are moved toward the distal ends of the finger sections along the holding center, and the finger section main bodies may be curved inward, and the distal ends of the finger sections may come close to each other when the proximal ends of the finger section main bodies are moved toward proximal ends of the finger sections along the holding center.

Thus, when the driving unit is operated, so that the linear moving mechanism moves the proximal ends of the finger section main bodies toward the distal ends along the holding center, the finger section main bodies formed of the elastic bodies are curved outward, and the reinforcing members connected to the distal ends of the finger section main bodies are swung around the swing axes, so that an interval between the distal ends of the finger sections can be largely widened. On the other hand, when the linear moving mechanism moves the proximal ends of the finger section main bodies toward the proximal ends along the holding center, the finger section main bodies formed of the elastic bodies are curved inward, the reinforcing members are swung around the swing axes, and the distal ends of the finger sections come close to each other, so that the work can be held.

In the above aspect, the work pressing section may include a contact section that is movably supported in a direction along the holding center, and comes into contact with the work, and an urging means for urging the contact section in such a direction as to press the contact section against the work.

Thus, when the work is inserted between the finger sections, the contact section of the work pressing section comes into contact with the work, is pressed by the work to be moved in the direction along the holding center, and is pressed against the work by the urging means. Consequently, impact at the time of coming into contact with the work can be relaxed, and stable friction force is generated between the work and the work pressing section, so that the work held between the finger sections can be maintained in a more reliably held state.

In the above aspect, the contact section may be formed in an annular shape surrounding the holding center.

Thus, even when the work has a convex curved surface like a sphere, the contact section formed in an annular shape is brought into contact with the work in a wide range, so that the work can be stably held.

REFERENCE SIGNS LIST

C holding center
W work
1 holding apparatus for a robot
4 finger section
5 work pressing section
5a contact section
5c coil spring (urging means)
6 driving unit
7 finger section main body
8 reinforcing member
9 air cylinder (linear moving mechanism)

The invention claimed is:

1. A holding apparatus for a robot comprising:
two or more finger sections disposed opposite to each other so as to face toward a holding center;
a work pressing section on which a work abuts when the work is inserted between the finger sections; and
a driving unit that moves distal ends of the two or more finger sections toward the holding center;
wherein each finger section of the two or more finger sections includes a finger section main body and a reinforcing member, each finger section main body comprising at least two elastic bodies, each reinforcing member being disposed along an outer surface of a respective finger section main body and joined to a distal end of the respective finger section main body, each reinforcing member having a higher rigidity than each respective finger section main body; and
wherein each reinforcing member is swingably provided around an axis perpendicular to a longitudinal direction of each finger section main body and parallel to a surface of each finger section main body.

2. The holding apparatus for a robot according to claim 1, wherein:
the driving unit includes a linear moving mechanism that moves a proximal end of each finger section main body along the holding center; and
the linear moving mechanism is operable to:
curve each finger section main body outward;
separate the distal ends of the two or more finger sections from each other when each proximal end of each finger section main body is moved toward the distal ends of the two or more finger sections along the holding center;
curve each finger section main bodies inward; and
move the distal ends of the finger sections toward each other when proximal ends of the finger section main bodies are moved toward proximal ends of the finger sections along the holding center.

3. The holding apparatus for a robot according to claim 2, wherein:
the work pressing section includes a contact section that is movably supported in a direction along the holding center and comes into contact with the work; and
the holding apparatus includes an urging means for urging the contact section in such a direction as to press the contact section against the work.

4. The holding apparatus for a robot according to claim 3, wherein the contact section is formed in an annular shape surrounding the holding center.

* * * * *